July 31, 1956          H. SIESE          2,756,787

CONCAVE MOULDING CIRCULAR SAW BLADE

Filed Feb. 25, 1955

INVENTOR
HENRY SIESE
Featherstonhaugh & Kent.
PATENT ATTORNEYS

United States Patent Office 2,756,787
Patented July 31, 1956

2,756,787

CONCAVE MOULDING CIRCULAR SAW BLADE

Henry Siese, Winnipeg, Manitoba, Canada

Application February 25, 1955, Serial No. 490,660

3 Claims. (Cl. 144—239)

My invention relates to new and useful improvements in moulding saw blades, the principal object and essence of my invention is to provide a device of the character herewithin described whereby recessed mouldings can be formed of varying depths and widths within limits with a single blade.

A further object of my invention is to provide a device of the character herewithin described which is adapted to be used upon a conventional circular saw arbor.

A further object of my invention is to provide a device of the character herewithin described which is simple in construction, economical in manufacture and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 2:
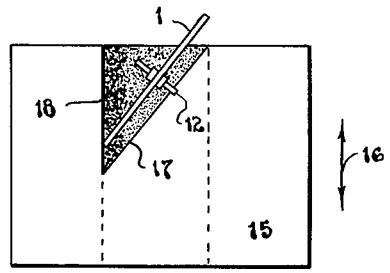
Figure 2 is a top plan view showing my saw partially entering a recess upon a block reduced in scale from Figure 1.

In the drawings accompanying this application I have illustrated the saw blade above the block in which the moulding is being formed in order that the function thereof can be more clearly illustrated, but it will be appreciated that, in use, the blade will be mounted upon a conventional circular saw table and the block passed over the blade at different angles, the depth of cut of the blade and hence the depth of the finished moulding being controlled by raising or lowering the blade in the usual way.

The normal process for forming substantially semi-circular recessed mouldings upon a block or strip of wood utilises milling cutters or milling blades having the desired profile of the finished moulding, and it is apparent that the milling cutters have to be changed when any change is desired in either the dimensions or profile of the moulding.

Not only are these milling cutters relatively expensive but considerable time is required when changing from one cutter to another, both of which detract from the ownership thereof by amateur craftsmen and the like.

The device hereinafter described overcomes these disadvantages inasmuch as a single blade can cut a wide variety of semi-circular mouldings which may vary in width between limits and which also may vary in depth between limits.

Figure 6:
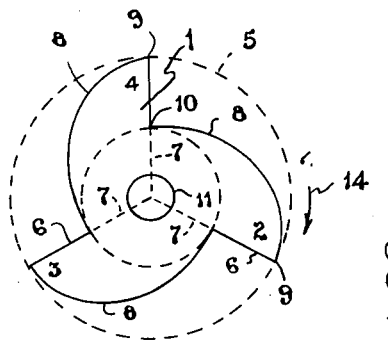
Figure 6 is a reduced schematic view of the blade showing the construction thereof from a disc.

Proceeding therefore to describe my invention in detail it will be seen upon reference to the accompanying drawings that the blade collectively designated 1 is trilobar in configuration being provided with three lobes 2, 3 and 4 these lobes being symmetrically formed from the disc and located 120° one from the other. In Figure 6 of the accompanying drawings the original disc is indicated by the dotted line 5.

Each of the lobes 2, 3 and 4 is formed with a radial leading edge 6, the leading edges of the three lobes being located on the 120° radii and indicated in phantom by the reference character 7. A spiral profile perimeter 8 completes the outline of each lobe, said spiral perimeter extending from the outer end 9 of the radial leading edge 6 and spiralling rearwardly and inwardly to meet the inner end 10 of the radial leading edge 6 of the next succeeding lobe.

In other words, the profile 8 of the lobe 2 extends from the outer end 9 of the leading edge 6 to the inner end 10 of the leading edge of the lobe 4. The profile 8 of the lobe 4 terminates at the inner end 10 of the leading edge 6 of the lobe 2. And the profile 8 of the lobe 3 terminates at the inner end of the leading edge of lobe 4.

The leading ends 6 of the lobes have a length equal to substantially half of the radius of the original disc 5 but this dimension is not too critical in the performance of the device. Finally, insofar as the construction of the blade is concerned, a centrally located aperture 11 is provided in the blade whereby same may be fitted to a conventional saw arbor indicated in the drawings by shaft 12, it being understood that the blade is secured to the arbor 12 in the conventional manner by means of collar 13.

Figure 5:
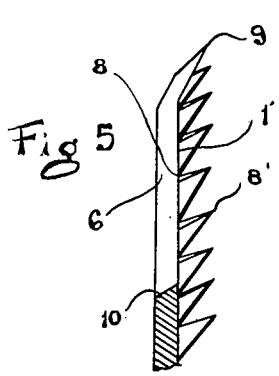
Figure 5 is an enlarged figure substantially on the lines 5—5 of Figure 1.
Figure 4:
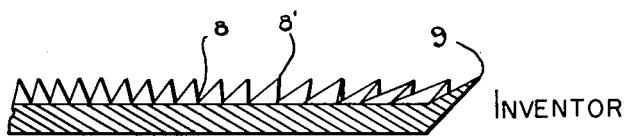
Figure 4 is an enlarged fragmentary section of the blade alone substantially along the lines 4—4 of Figure 1.

The aforementioned profile perimeters 8 of the lobes 2, 3 and 4 are provided with raked cutting teeth 8', said teeth being adapted to have a planing action when work is offered up to the face 1' of the blade at any angle between zero and 90°. In order to provide clearance and prevent binding, the teeth are set over towards this face as clearly shown in Figure 5, thus giving a flat dished effect to the blade when viewed in section.

In operation, the device is adapted to be rotated in the conventional way in the direction of arrow 14 and the block or work 15 upon which the moulding is to be cut as indicated can be moved over the blade in the direction of the double headed arrow 16. The moulding or recess to be formed is determined by first the angle of attack which the block 15 makes with the blade 1, and secondly by the amount by which the blade is permitted to project above the surface of the saw table.

Figure 3:
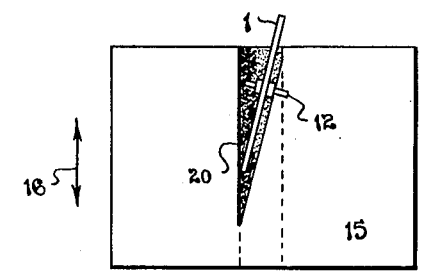
Figure 3 is a view similar to Figure 2 but with a different angle of attack.
Figure 1:
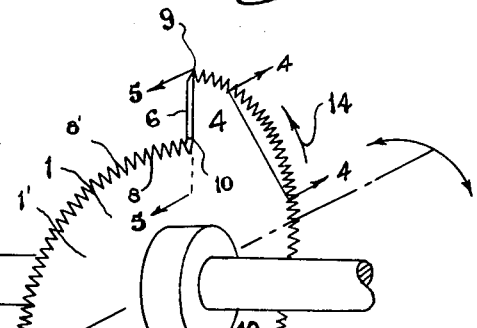
Figure 1 is a view of my blade upon a shaft together with a block showing the angle of attack of the blade in order to form the recess shown.
Figure 1:
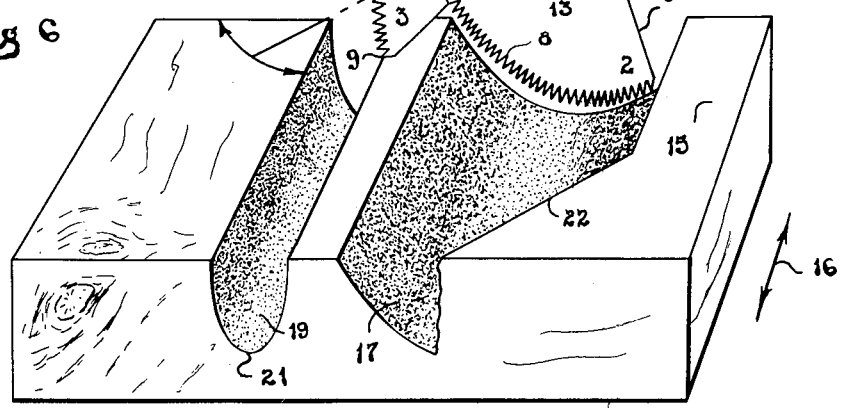

The recess 17 in Figures 1 and 2 is formed by a fairly wide angle of attack indicated in Figure 2 at 18 whereas the recess 19 in Figures 1 and 2 is formed by a fairly narrow angle of attack indicated at 20 in Figure 3. The outer end 9 of the leading edges 6 of the blade penetrate to the base 21 of the recess being cut whereas the teeth 8' on the perimeters 8 of the lobes act upon the front face 22 of the recess being formed thus giving a planing action on this area which cuts down materially on the power required in order to drive the blade, it being understood that the aforementioned dished configuration of the blade prevents any binding from occurring.

The angle of attack of the work to the blade can be controlled by a conventional fence and the depth can be controlled by the conventional depth control of the circular saw machine neither of which have been illustrated as they are conventional. The action merely consists of setting the desired angle on the fence and sliding the work therealong over the rotating blade in order to form the moulding or recess.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tri-lobar saw blade disc, the lobes on said disc being symmetrically located around the axis thereof, each of said lobes having a radial leading edge and a spiral profile perimeter, each of said spiral profile perimeters extending from the outer end of said leading edge of each lobe to the inner end of the leading edge of the next succeeding lobe, and cutting teeth on said spiral profiles.

2. The device according to claim 1 in which said teeth are offset to one side of said disc thereby giving said disc a dished configuration when viewed in section.

3. The device according to claim 1 in which said spiral profile of each lobe commences at a distance of approximately half the radius of said disc from the axis thereof and increases to a maximum equal to the diameter of the disc through an arc of approximately 60°.

References Cited in the file of this patent

UNITED STATES PATENTS

| | | |
|---|---|---|
| 173,122 | Houghton | Feb. 8, 1876 |
| 178,918 | Finn | June 20, 1876 |
| 338,695 | Barnes | Mar. 30, 1886 |
| 717,719 | Schmidt | Jan. 6, 1903 |